United States Patent [19]

Drlik

[11] 4,351,086
[45] Sep. 28, 1982

[54] BIASED EYEGLASS HINGE

[75] Inventor: Günther Drlik, Pforzheim, Fed. Rep. of Germany

[73] Assignee: OBE-Werk Ohnmacht & Baumgartner GmbH & Co. K.G., Ispringen, Fed. Rep. of Germany

[21] Appl. No.: 189,037

[22] Filed: Sep. 22, 1980

[30] Foreign Application Priority Data

Oct. 3, 1979 [DE] Fed. Rep. of Germany ....... 2940055

[51] Int. Cl.³ .......................... G02C 5/22; E05D 7/06
[52] U.S. Cl. ....................................... 16/228; 351/113
[58] Field of Search ................... 16/128 A, 190, 228; 351/113

[56] References Cited

U.S. PATENT DOCUMENTS 3,567,315  3/1971  Speer ................................. 351/113
3,771,194  11/1973 Little ................................. 16/190
4,005,930  2/1977  Guenin ............................. 16/128 A

FOREIGN PATENT DOCUMENTS 2354919  5/1975  Fed. Rep. of Germany ...... 351/113

Primary Examiner—Werner H. Schroeder
Assistant Examiner—Andrew M. Falik
Attorney, Agent, or Firm—Balogh, Osann, Kramer, Dvorak, Genova & Traub

[57] ABSTRACT

This invention relates to a spring hinge for eyeglasses having plastic or metal bows. The hinge includes a first hinge member which is adapted to be connected to a bow, and a second hinge member which is adapted to be connected to a frame center part, both hinge members being pivotally interconnected. The first hinge member is connected to an elongated U-shaped slider which extends into and is guided in a flat receptacle provided at the end of the bow. A spring member fitted on a rod is received in the slider for urging the same into the receptacle. The first hinge member has a portion overlapping the receptacle adjacent to the open end thereof. Between the slider and the overlapping portion, the first hinge member is further provided with a bevelled surface for engaging the outlet edge of the receptacle when the hinge is retracted so that there is no backlash during the movement of the bow from the inturned position to the normal open position.

3 Claims, 4 Drawing Figures

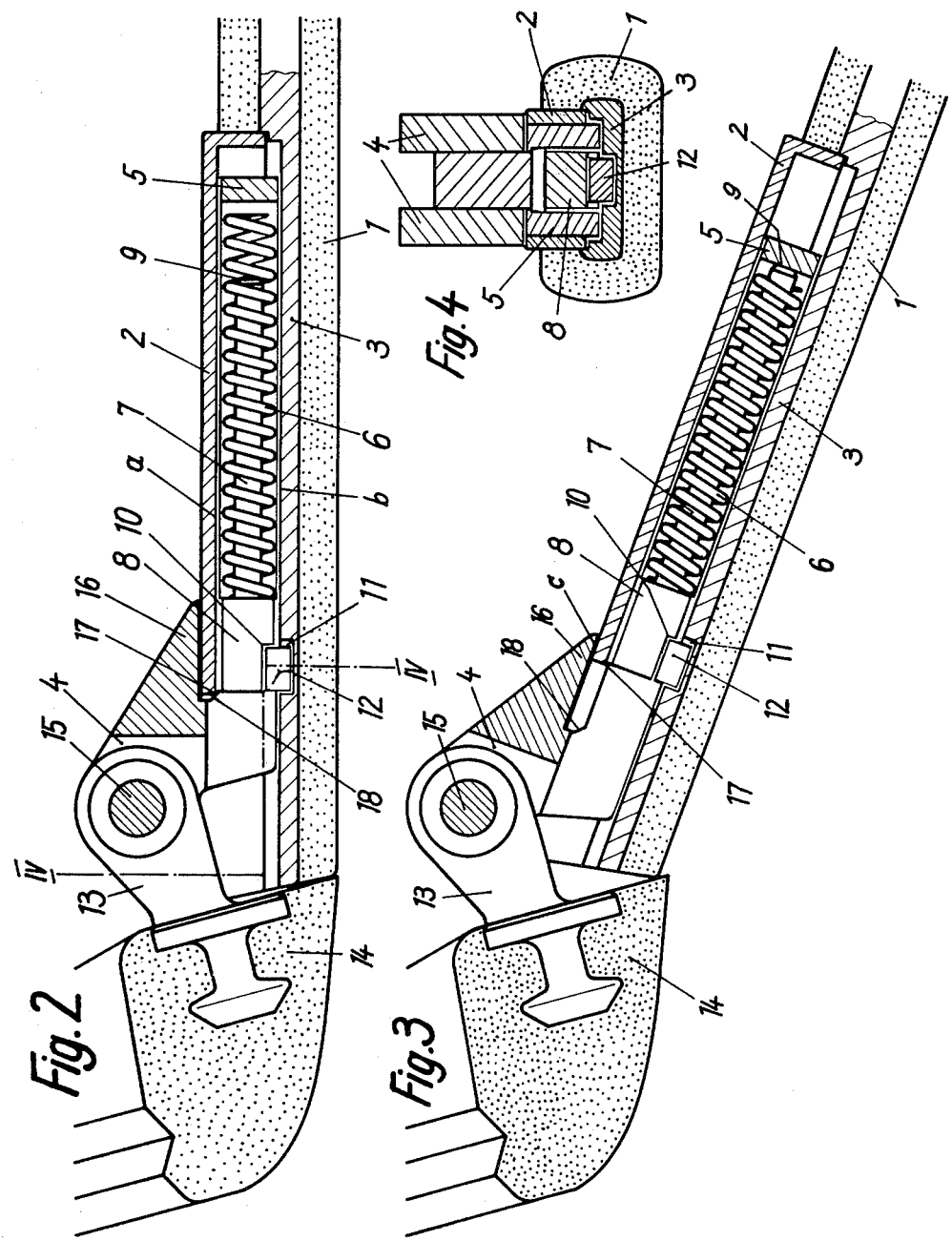

BIASED EYEGLASS HINGE

FIELD OF INVENTION

The invention relates generally to a hinge for eyeglasses having plastic or metal bows, and particularly to a spring hinge which permits the bow to be deflected beyond its stop position so that the bow will resiliently engage the head of the wearer.

BACKGROUND OF INVENTION

The known spring hinges as characterized above cannot be made economically in large quantities (by modern manufacturing methods) without finishing operations, if an exact guidance is to be ensured at the hinge axis and if the overall height of the spring hinge is to be minimized. In this connection, it is necessary to meet the requirements of the hingemaker as regards manufacturing technology, and of the eyeglass maker as regards processing technology, and the requirements of the optician and the wearer of the eyeglasses regarding the function of the hinge. Safety is also important for the wearer.

The requirements of the eyeglass maker regarding manufacturing technology result from the various technologies used in making spectacle frames. For instance, plastic frames are either milled from acetate slabs, which are mostly extruded, or are injection-molded from propionate granules, or vacuum-cast from epoxy resins. A spring hinge which can be used in all these different manufacturing processes has not yet been provided. Such spring hinge should also be usable with a metal bow.

In all manufacturing processes, a good joint between the spring hinge and the metal core of the plastic bow or the metal bow is a requirement for a satisfactory and economical processing.

In plastic bows made from slab material, the metal cores of the bows and the spring hinge are shot into the bow material, which has been thermally plasticized. A dense joint between the spring housing and the bow core is required, as well as a neat pressing of the partly bulged plastic material. In the thermoplastic processing of the spring hinge, the spring housing must be tightly joined under pressure to the bow core and must provide a seal against the injection mold. In addition, the housing mold must permit a satisfactory removal of the injection-molded part from the mold. In the vacuum-casting of casting resin, the absolute pressure and vacuum tightness of the seal between the housing and the bow core is of great significance. In case of a leak, low-viscosity casting resin might penetrate in the evacuated casting mold into the interior of the housing, so that the spring hinge would not be operative.

SUMMARY OF THE INVENTION

The present invention is aimed at providing an improved spring hinge which can substantially eliminate the aforementioned problems encountered in the prior art, and can meet the requirements of all manufacturing processes, so as to allow the use of a single type of a spring hinge in wide field applications, including plastic and metal eyeglasses.

In accordance with the invention, a spring hinge for use in an eyeglass frame, having a frame center part and two bows, each of which including a metal portion, may include the following:

A flat box receptacle having an open end in opposition to the closed end, and adapted to be embedded and secured to the metal portion of one of the bows, a first hinge member connected to a plunger including a U-shaped slider which, in turn, is provided with spring means, fitted on a rod, for urging the slider to move into the receptacle. The slider having two legs axially guided in and extending out of the receptacle, a second hinge member pivotally connected to the first hinge member, and adapted to be secured to the frame center part.

The first hinge member is provided with a portion overlapping the receptacle on the outside thereof, adjacent to the open end of the receptacle.

In addition, the first hinge member has a bevelled surface between the overlapping portion and the slider so that, when the hinge is retracted, the bevelled surface engages the outlet edge of the receptacle, thereby eliminating the backlash during the movement of the bow from the deflected position to the normal open position.

BRIEF DESCRIPTION OF THE DRAWINGS

Further details of the spring hinge according to the invention will now be explained with reference to the drawings, in which:

FIGS. 2 and 3 are central sectional views showing a complete hinge in the normal and deflected positions, respectively, and FIG. 4 is a transverse sectional view showing the hinge and being taken on line IV—IV of FIG. 2.

DETAILED DESCRIPTION OF THE INVENTION

Figure 1:
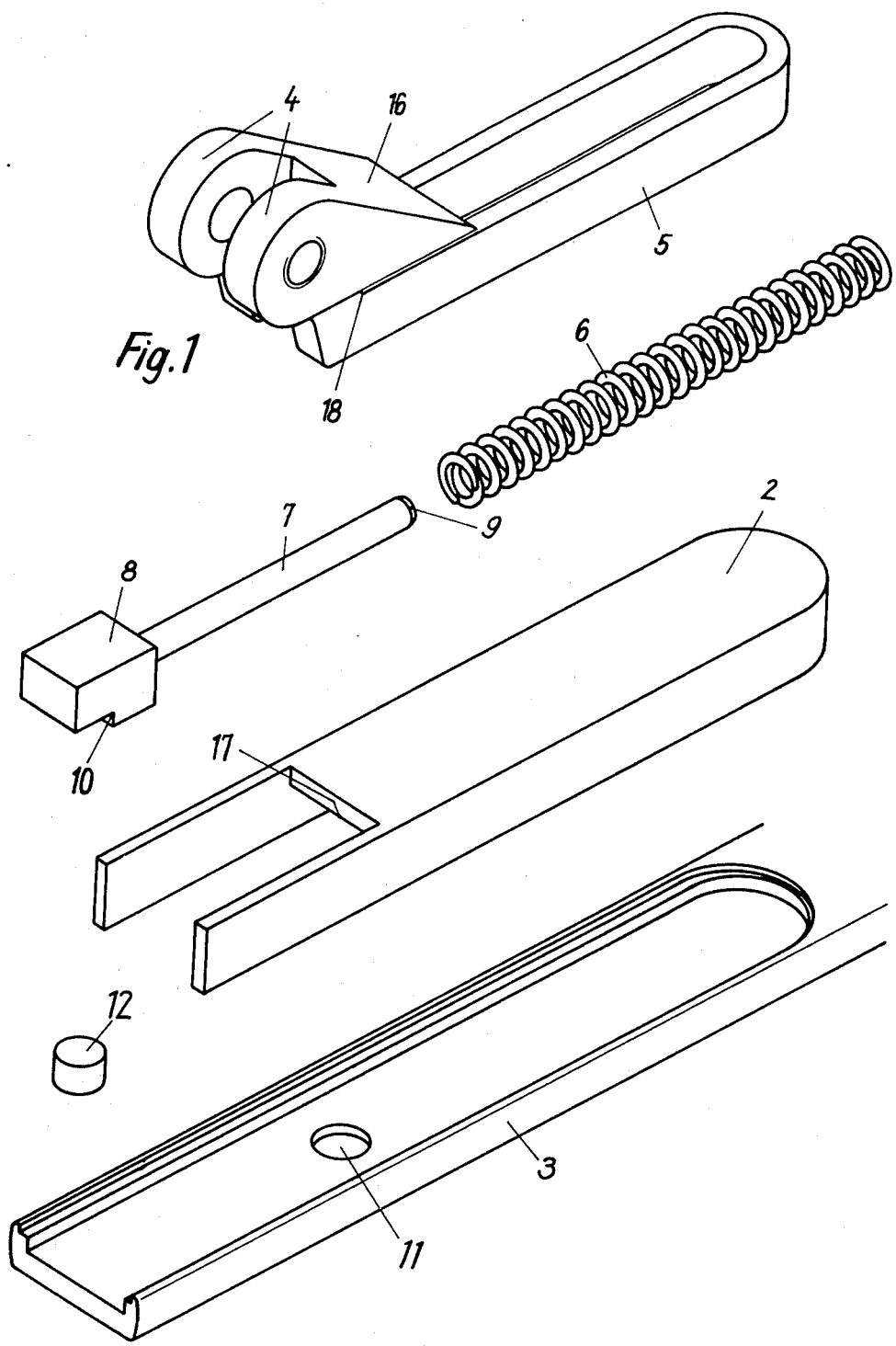
FIG. 1 is a perspective exploded view of a portion of the hinge of the invention.

As is apparent from FIG. 2, the spring hinge is provided at the end of the plastic bow 1 and comprises a receptacle consisting of an open ended flat box 2, which is directly connected to the metal core 3 of the bow. The first hinge member 4 carries an elongated U-shaped slider 5, which is guided in the flat box and receives the helical compression coil spring 6. The latter is fitted on a rod 7, which at the outlet end of the receptacle carries a plug 8 and has a free end 9 serving as deflection-limiting stop as shown in FIG. 3.

The plug 8 and the spring pin 7 are inserted into the flat box 2 against spring force and can be locked by a locking member 12, which engages a shoulder 10 of the plug and extends at 11 into the metal core 3 of the bow. The second hinge member 13 is secured to the frame center part 14 and is pivotally connected in the conventional manner by a pivot pin or pivot screw 15 to the eyes of the first hinge member 4. The first hinge member 4 is mounted on the free leg end of the U-shaped slider 5 and has a portion 16 which overlaps the flat box 2 and is engageable with the outlet edge 17. This feature provided for a covering and additional guiding function.

In the hinge described hreinbefore, the backlash of the U-shaped slider 5 in the flat box 2 is determined during the assembling operation by the provision of clearance a and b (FIG. 2). During the deflecting operation, the backlash is determined by the clearance c (FIG. 3) between the overlapping portion 16 and the receptacle or flat box 2. Finally, the first hinge member 4 has between the U-shaped slider 5 and the overlapping portion 16 a beveled surface 18, which ensures that the backlash is entirely eliminated during the movement of the bows 1 from the deffected or inturned position to the normal open position shown in FIG. 2 because when the hinge is retracted the beveled surface 18 engages the outlet edge 17 of the flat box 2 under spring pressure. During the opening movement of the bow 1 from the inturned position to the normal open position (FIG. 2), there will be no backlash at all. This has not been accomplished with the previous spring hinges but only with quality hinges of conventional type, which are not extensible by spring force.

The present invention constitutes, therefore, an improvement over the prior art, in providing a functionally reliable spring hinge, having a low overall height, and providing a backlash-free axial and radial connection in a quality comparable with the quality of standard hinges for eyeglasses, all this being accomplished with simple structural means.

The spring hinge in accordance with the present invention permits the bow to be deflected beyond its stop position so that the bow will resiliently engage the head of the wearer.

What is claimed is:

1. In a spring hinge for use in an eyeglass frame having a frame center part and two bows, each of which having an inner end comprising a metal portion, said spring hinge comprising, a sub-assembly including a receptacle having an open end and adapted to be secured to one of said bows at said inner end thereof, a first hinge member having an end portion extending into said receptacle, a plunger rigid with said first hinge member and extending into said receptacle, spring means urging said plunger into said receptacle, and a second hinge member pivoted to said first hinge member and secured to said frame center part, the improvement comprising, said receptacle comprising a flat box embedded in said bow and secured to said metal portion so that said open end of said receptacle is disposed near said inner end of said bow, said plunger comprising a U-shaped slider, which has a bight disposed in said receptacle and two legs axially guided in and extending out of said receptacle, a rod disposed in said receptacle and extending between the legs of said slider, a spring retainer disposed in said receptacle near the open end thereof, between the legs of said slider, and axially rigid with said rod, and axially fixed to said metal portion, said spring means comprising a coil spring, surrounding said rod, and disposed between the legs of said slider, and retained between said spring retainer and said bight, and urging said slider into said receptacle toward a position in which said rod is clear of said bight, said slider movable into said receptacle against the force of said coil spring until rod engages said bight, said first hinge member secured to said legs of said slider outside said receptacle, and comprising an overlapping portion which overlaps said receptacle on the outside thereof adjacent to said open end, and said first hinge member formed with a bevelled surface disposed outside said receptacle, between said overlapping portion and said slider, and facing said open end of said receptacle, whereby, when said hinge is retracted, said bevelled surface engages the outlet edge of said receptacle, at said open end thereof, so that there is no backlash during the movement of said bow from the inturned position to the normal open position.

2. An improved spring hinge as set forth in claim 1, wherein said U-shaped slider is fitted with predetermined lateral clearances in said receptacle.

3. An improved spring hinge as set forth in claim 1, wherein said spring retainer has a shoulder, and when said spring retainer has been inserted into said receptacle against the force of said spring, the shoulder is adapted to be locked in position by means of a locking member which is engageable with the shoulder and adapted to be locked into said metal portion.

* * * * *